(12) United States Patent
Takata (10) Patent No.: US 7,766,500 B2
(45) Date of Patent: Aug. 3, 2010

(54) BACKLIGHT UNIT, AND A DISPLAY DEVICE INCLUDING THE SAME

(75) Inventor: Yoshiki Takata, Suzuka (JP)

(73) Assignee: Sharp Kabushiki Kaisha, Osaka (JP)

(*) Notice: Subject to any disclaimer, the term of this patent is extended or adjusted under 35 U.S.C. 154(b) by 324 days.

(21) Appl. No.: 11/908,078

(22) PCT Filed: Feb. 17, 2006

(86) PCT No.: PCT/JP2006/302802

§ 371 (c)(1),
(2), (4) Date: Sep. 7, 2007

(87) PCT Pub. No.: WO2006/095552

PCT Pub. Date: Sep. 14, 2006

(65) Prior Publication Data

US 2009/0080179 A1   Mar. 26, 2009

(51) Int. Cl.
*F21V 7/10* (2006.01)
(52) U.S. Cl. ...................... 362/97.4; 362/633
(58) Field of Classification Search ......... 362/632–634, 362/97.2, 97.4
See application file for complete search history.

(56) References Cited

U.S. PATENT DOCUMENTS

| 6,835,961 | B2 | 12/2004 | Fukayama |
| 6,979,114 | B2* | 12/2005 | Kao ............................ 362/633 |
| 7,093,971 | B2* | 8/2006 | Yu et al. ...................... 362/633 |
| 7,101,074 | B2* | 9/2006 | Kuo et al. .................... 362/634 |
| 7,178,967 | B2* | 2/2007 | Kim ............................ 362/633 |
| 7,188,965 | B2* | 3/2007 | Chang et al. ................ 362/97.4 |
| 7,244,966 | B2 | 7/2007 | Fukayama |

FOREIGN PATENT DOCUMENTS

| JP | 2000-131692 A | 5/2000 |
| JP | 2002-196312 A | 7/2002 |
| JP | 2004-235103 A | 8/2004 |
| JP | 2004-327328 A | 11/2004 |
| JP | 2005-010735 A | 1/2005 |

OTHER PUBLICATIONS

Official communication issued in the International Application No. PCT/JP2006/302802, mailed May 23, 2006.

* cited by examiner

*Primary Examiner*—Sandra L O'Shea
*Assistant Examiner*—Leah S Lovell
(74) *Attorney, Agent, or Firm*—Keating & Bennett, LLP (57) ABSTRACT

A backlight unit is capable of preventing optical sheets from experiencing deformation due to thermal expansion and the like. The backlight unit includes a backlight chassis arranged to house a lamp via a diffusion plate and optical sheets, where a thickness of the optical sheets is less than a thickness of the diffusion plate, the backlight chassis including a support surface arranged to support the diffusion plate and the optical sheets, and a frame arranged to hold the diffusion plate and the optical sheets with the support surface, the diffusion plate and the optical sheets being interposed between the frame and the support surface, and the backlight chassis has a positioning piece arranged to position and support the diffusion plate at a predetermined position with respect to the support surface and not to position and support the optical sheets.

3 Claims, 6 Drawing Sheets

BACKLIGHT UNIT, AND A DISPLAY DEVICE INCLUDING THE SAME

BACKGROUND OF THE INVENTION

1. Field of the Invention

The present invention relates to a backlight unit for housing a lamp that is a light source of a display device with a backlight, and specifically relates to a backlight unit preferably used in a liquid crystal display device including a translucent liquid crystal display panel.

2. Description of the Related Art

A liquid crystal display device and the like including a translucent liquid crystal display panel, which are cited as an example of a flat-screen display device, generally have a backlight unit arranged behind the liquid crystal display panel. The backlight unit is a device including a tubular lamp such as a cold cathode tube as a light source, which controls the properties of light emitted from the tubular lamp and projects the light toward a rear side of the display panel. The projected light passes through the display panel, making an image displayed visible on a front side of the display panel.

Figure 4:
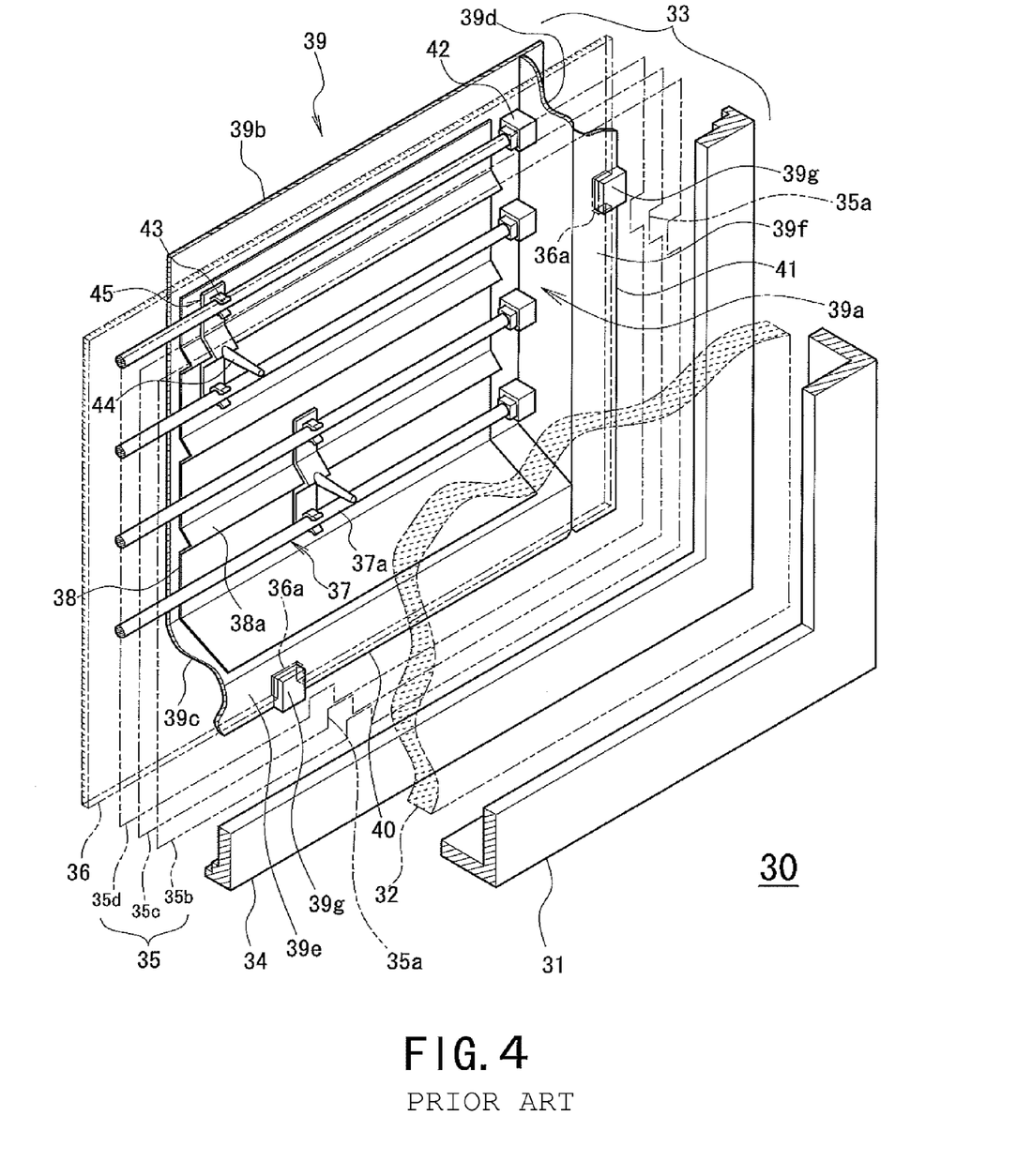
FIG. 4 is an exploded perspective view schematically illustrating a backlight unit of a conventional liquid crystal display device.

FIG. 4 is an exploded perspective view schematically illustrating relevant parts of a structure of a generally conventional liquid crystal display device. A liquid crystal display device 30 includes a bezel 31, a display panel 32 and a backlight unit 33. The bezel 31 is a member that defines a frame of the display panel 32, and the display panel 32 is made by bonding two panels of glass so as to seal in a liquid crystal therebetween.

The backlight unit 33 includes a frame 34, optical sheets 35, a diffusion plate 36, tubular lamps 37, a reflector 38 and a backlight chassis 39. The frame 34 is shaped like a picture frame and secures the optical sheets 35 and the diffusion plate 36 to the backlight chassis 39. The optical sheets 35 and the diffusion plate 36 are provided for controlling the properties of light which is emitted from the tubular lamps 37 and enters the display panel 32. In this case, the optical sheets 35 are made up of three sheets including a diffusion sheet 35b, a lens sheet 35c and a polarizing reflection sheet 35d, each of which has a thickness of 0.1 mm to 0.3 mm. The diffusion plate 36 has a thickness of about 2 mm.

Figure 5:
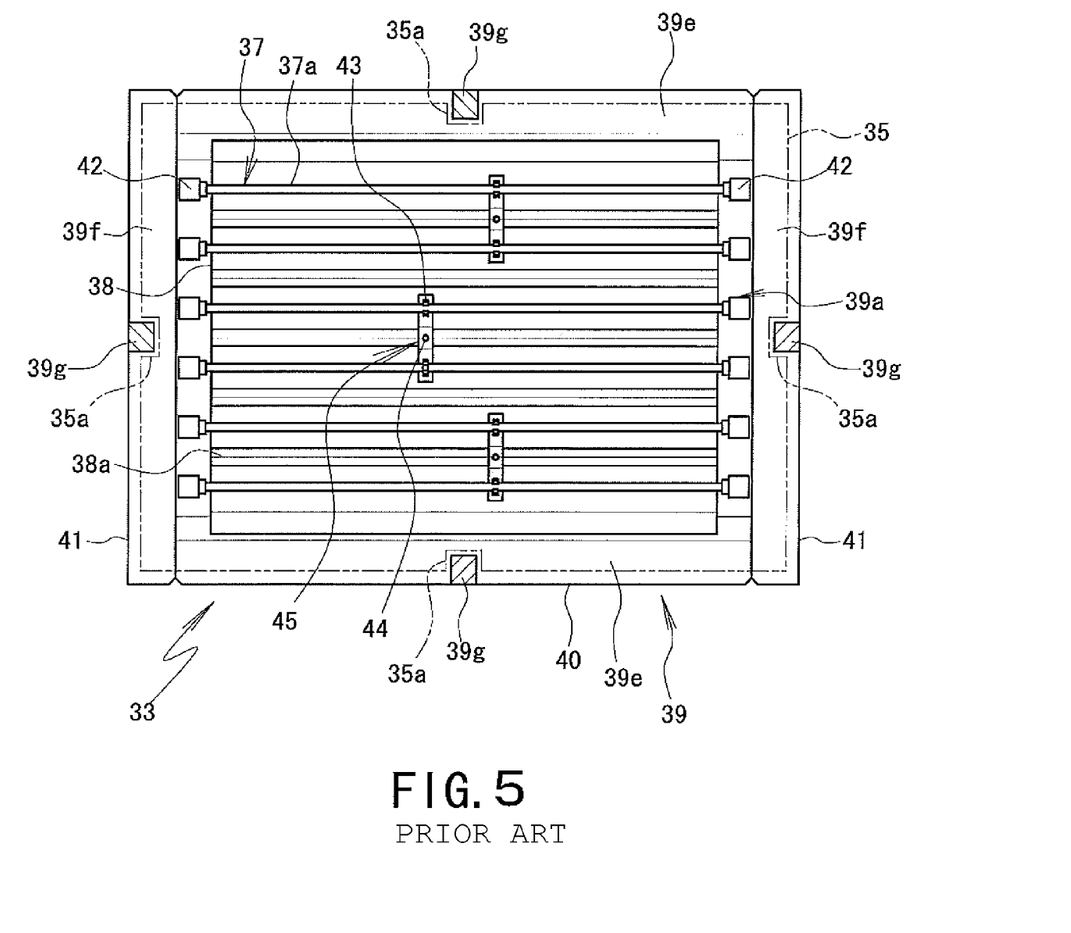
FIG. 5 is a front view showing the backlight unit shown in FIG. 4 in a state where a frame is removed.

In this case, right-side and left-side ends of the tubular lamps 37 are inserted into electrode part holders 42 so as to be secured to the backlight chassis 39, as shown in a front view of FIG. 5. The reflector 38 is laid under the tubular lamps 37, for reflecting the light emitted from the tubular lamps 37 toward the display panel 32. In order to improve reflectivity, projections 38a having a crest shape are provided on the reflector 38 so as to be located respectively between tube sections 37a of the tubular lamps 37.

The backlight chassis 39, substantially in the shape of a box, has a lamp housing portion 39a including a bottom portion 39b and side-wall portions 39c and 39d, and support surfaces 39e and 39f extending outward respectively from upper edges of the side-wall portions 39c and 39d. In the backlight chassis 39, the bottom portion 39b and the longer side-wall portions 39c are formed of a member 40 which is prepared by subjecting a metal plate material to plate metal processing, and the shorter side-wall portions 39d are formed of a member 41 which is molded of resin.

The tubular lamp 37 is secured to the lamp housing portion 39a of the backlight chassis 39 with the use of the above-mentioned electrode part holder 42, and also with the use of a member 45 which includes lamp clips 43 for holding the tube section 37a at an approximate midpoint thereof, and a holding pin 44 for preventing the diffusion plate 36 which is arranged above from bending downward to preclude luminance irregularity, as illustrated.

The above-mentioned frame 34 is secured to the support surfaces 39e and 39f of the backlight chassis 39 while interposing the optical sheets 35 and the diffusion plate 36 therebetween. In this case, as shown in FIG. 5, protrusion portions 39g having a square shape are formed at center portions of the support surfaces 39e and 39f, and concave portions 35a and concave portions 36a are formed as a notch at center positions on the edges of the optical sheets 35 and the diffusion plate 36. By fitting the protrusion portions 39g of the support surfaces 39e and 39f into the concave portions 35a of the optical sheets 35 and the concave portions 36a of the diffusion plate 36, the optical sheets 35 and the diffusion plate 36 are positioned and supported on the support surfaces 39e and 39f. Thereby, the diffusion plate 36 having the thickness of 2 mm, which is relatively heavy, is prevented from rattling inside the backlight unit 33.

Incidentally, as a prior art literature relating to the present invention, Japanese Patent Application Unexamined Publication No. 2002-196312 is cited.

In the above-described backlight unit 33, a thermal factor of the tubular lamp 37 that is the light source contributes to thermal expansion or thermal contraction of structural components thereof. As illustrated, the diffusion plate 36 is arranged in close proximity to the tubular lamps 37; therefore, when a certain period of time passes after lightening the tubular lamps 37, for example, the diffusion plate 36 tends to be warped toward the display panel 32 and lose flatness.

Figure 6:
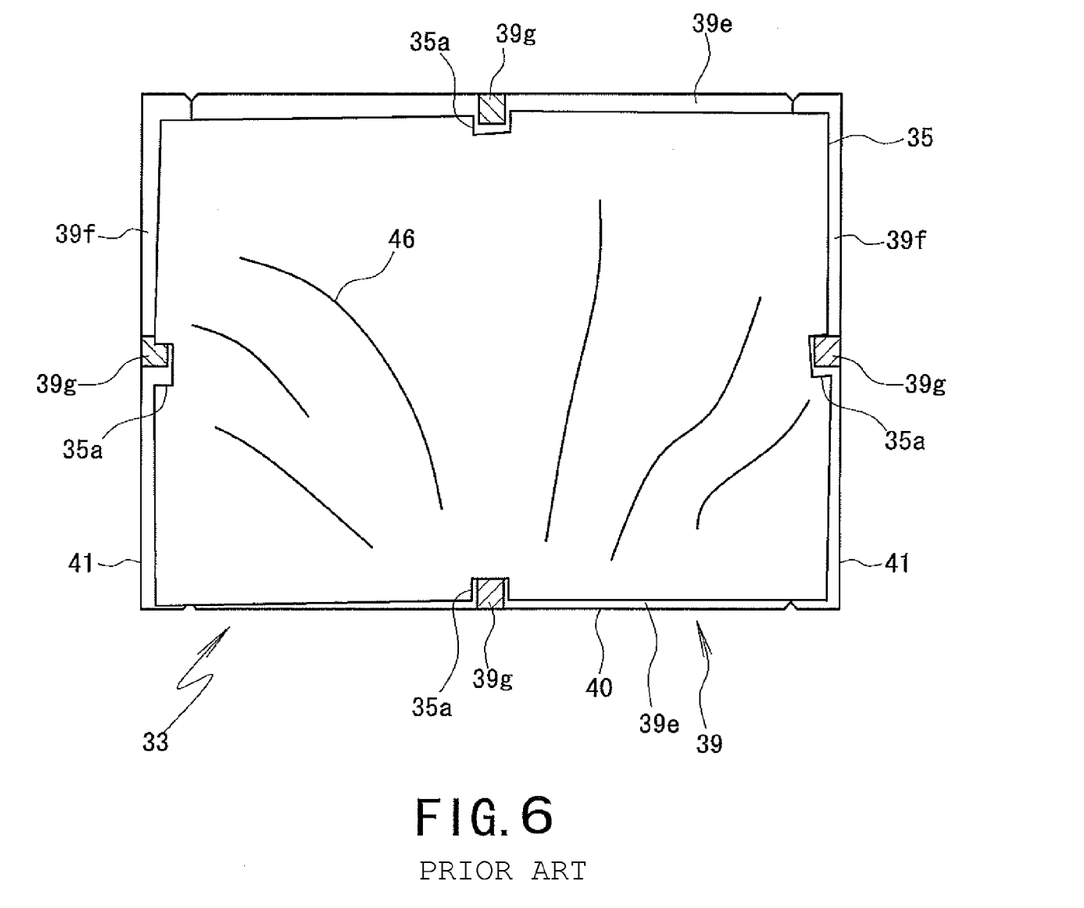
FIG. 6 is a view showing a state of optical sheets at the time of using the backlight unit shown in FIG. 4.

Since the liquid crystal display device 30 is generally used in an upright position, the thin optical sheets 35 of which each sheet has a thickness of 0.1 mm to 0.3 mm, suffer a plurality of deformed portions 46 at the time of the thermal expansion, because the concave portions 35a get onto or hitches on the protrusion portions 39g for positioning, as shown in FIG. 6. If the optical sheets 35 suffer the deformed portions 46, a display on the display panel 32 has luminance irregularity.

SUMMARY OF THE INVENTION

In order to overcome the problems described above, preferred embodiments of the present invention provide a backlight unit that is capable of preventing optical sheets from being deformed due to thermal expansion and the like, and also provide a display device including such a backlight unit.

According to a preferred embodiment of the present invention, a backlight unit arranged behind a display panel includes a backlight chassis arranged to house a lamp via a diffusion plate and optical sheets, where a thickness of the optical sheets is less than the thickness of the diffusion plate, including a support surface arranged to support the diffusion plate and the optical sheets, and a frame arranged to hold the diffusion plate and the optical sheets with the support surface of the backlight chassis, the diffusion plate and the optical sheets being interposed between the frame and the support surface, wherein the backlight chassis has, on its support surface, a positioning piece arranged to position and support the diffusion plate at a predetermined position with respect to the support surface and arranged not to position and support the optical sheet.

In this case, it is preferable that a width of a gap between the support surface of the backlight chassis and the frame is equal to or larger than a total thickness of the diffusion plate and the optical sheets. In addition, it is preferable that the positioning piece has a protrusion shape, fits into a concave portion including a notch on an edge of the diffusion plate and has a height so as not to make contact with the optical sheets.

It is preferable that a display device includes the backlight unit.

According to the backlight unit having the above-described configurations, since the backlight chassis has, on its support surface, the positioning piece arranged to position and support the diffusion plate at the predetermined position with respect to the support surface and arranged not to position the optical sheets, the positioning piece does not interfere with a thermal expansion increment of the optical sheets. Accordingly, a deformed portion which occurs when the positioning piece interferes with the thermal expansion increment of the optical sheets as shown in FIG. 6 is prevented, and luminance irregularity caused thereby is precluded.

In this case, by using the unique configuration in which the width of the gap between the support surface of the backlight chassis and the frame is equal to or larger than the total thickness of the diffusion plate and the optical sheets, a load generated by the interposition is not applied on the optical sheets, the optical sheets are allowed to expand or contract by the thermal expansion increment in any direction and the occurrence of the deformed portion in the optical sheets is prevented more advantageously. In addition, by using the unique configuration in which the positioning piece has the protrusion shape so as to fit into the concave portion formed as the notch at the edge of the diffusion plate and has the height so as not to make contact with the optical sheets, preferred embodiments of the present invention can be simply carried out by only changing the height of a conventionally used positioning piece having a protrusion shape.

By preparing a display device incorporating the backlight unit having the above-described configurations, the occurrence of luminance irregularity in the display in use is prevented.

These and other features, elements, characteristics, steps and advantages of the present invention will become more apparent from the following detailed description of preferred embodiments thereof with reference to the attached drawings.

DETAILED DESCRIPTION OF THE PREFERRED EMBODIMENTS

Figure 1:
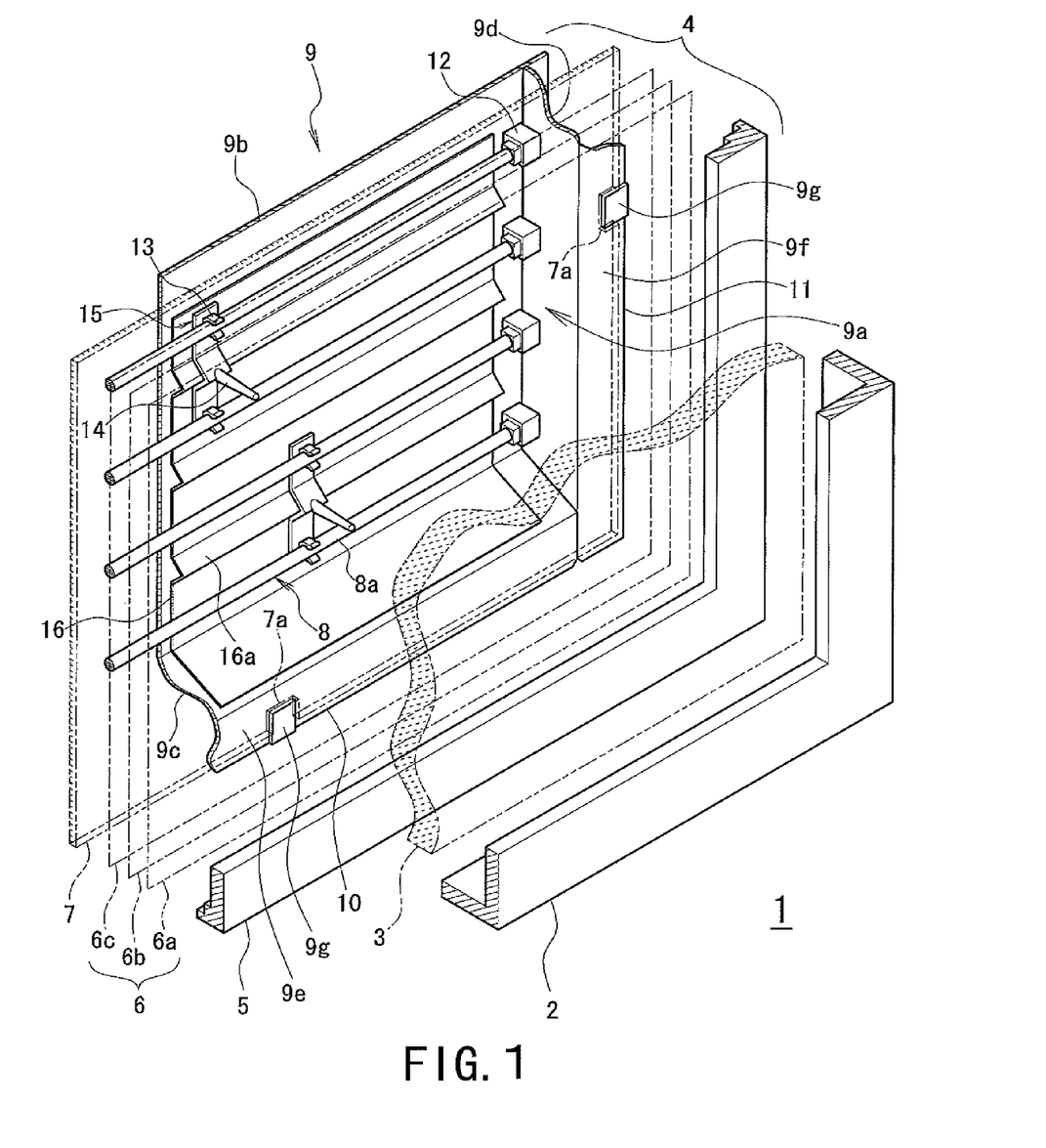
FIG. 1 is an exploded perspective view schematically illustrating a backlight unit of a liquid crystal display device according to a preferred embodiment of the present invention.
Figure 2:
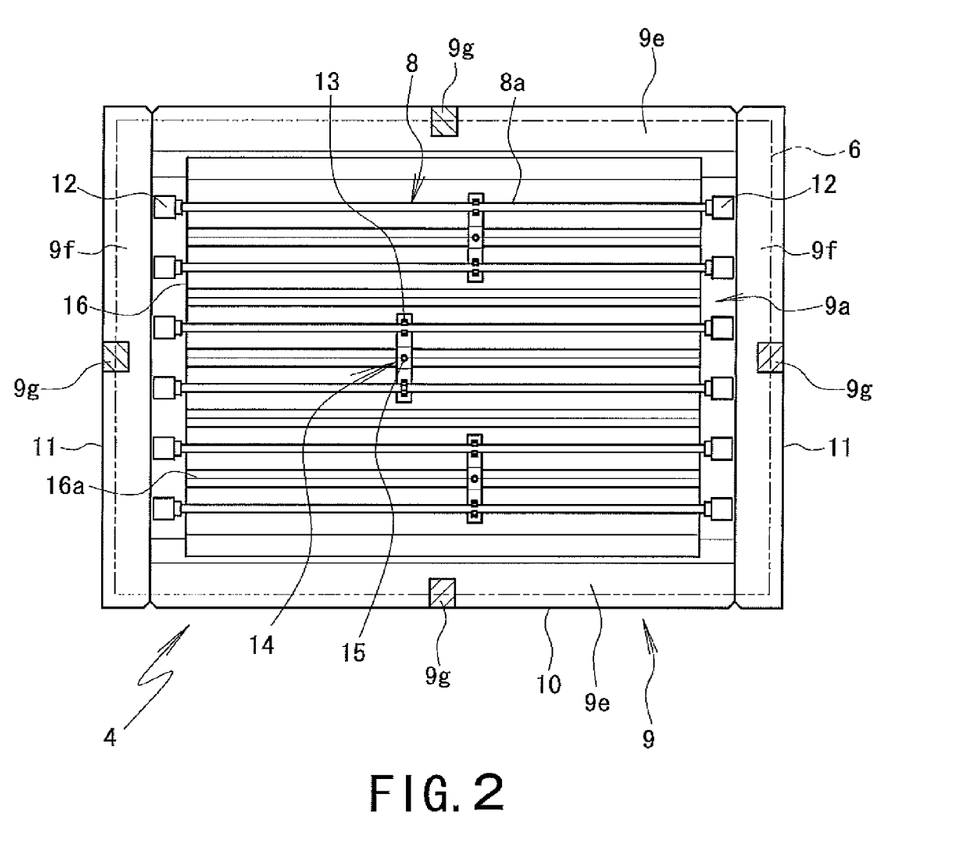
FIG. 2 is a front view showing the backlight unit shown in FIG. 1 in a state where a frame is removed.
Figure 3:
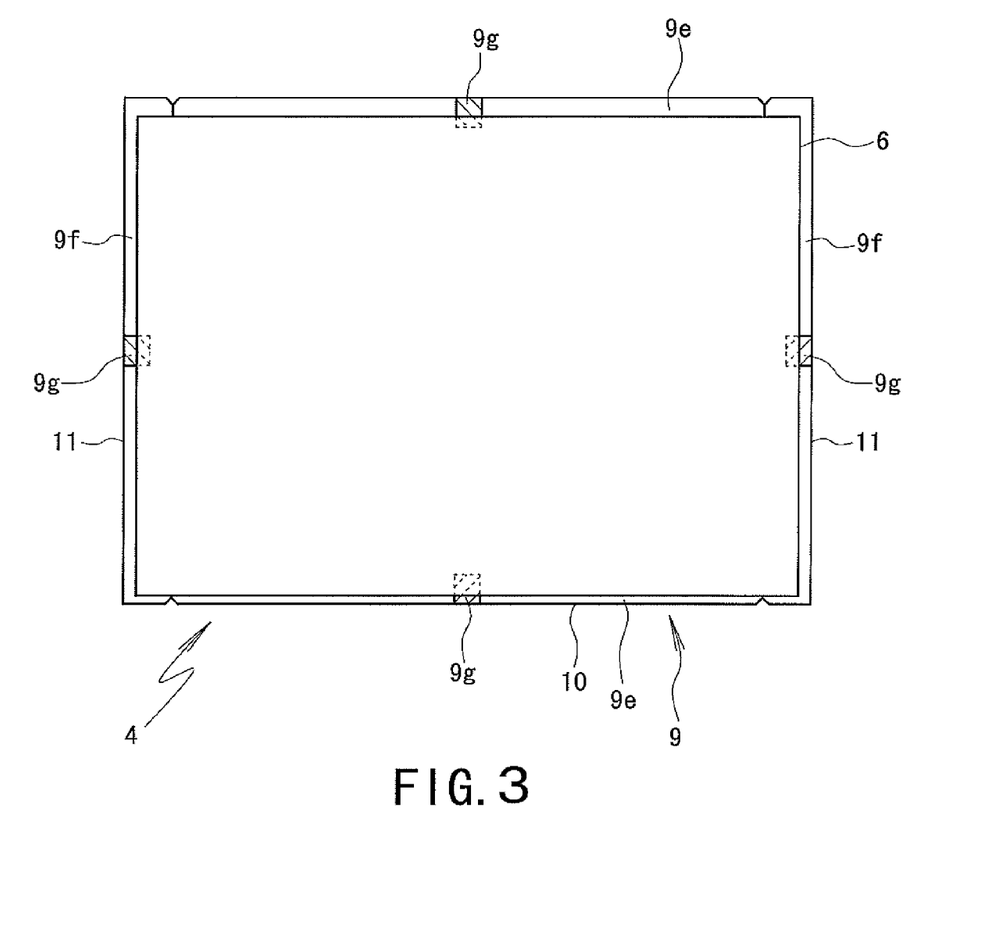
FIG. 3 is a view showing a state of optical sheets at the time of using the backlight unit shown in FIG. 2.

A detailed description of a display device according to preferred embodiments of the present invention will now be given with reference to the accompanying drawings. FIG. 1 is an exploded perspective view schematically illustrating relevant portions of a structure of a liquid crystal display device according to preferred embodiments of the present invention. FIG. 2 is a front view showing a backlight unit shown in FIG. 1 in a state where a frame is removed. FIG. 3 is a view showing a state of optical sheets at the time of using the backlight unit shown in FIG. 2. The exploded perspective view of FIG. 1 is an enlarged view of a lower right portion of the backlight unit of FIG. 2.

As shown in FIG. 1, a liquid crystal display device 1 preferably includes a bezel 2, a display panel 3 and a backlight unit 4. The bezel 2 is a member defining a frame of the display panel 3, which protects the display panel 3 and ensures strength of the entire liquid crystal display device 1. The display panel 3 is made by bonding two panels of glass to seal in a liquid crystal therebetween.

The backlight unit 4 includes a frame 5, optical sheets 6, a diffusion plate 7, tubular lamps 8 and a backlight chassis 9. The frame 5 is preferably shaped like a picture frame and secures the optical sheets 6 and the diffusion plate 7 to the backlight chassis 9 in a state where the optical sheets 6 and the diffusion plate 7 are laminated.

The optical sheets 6 and the diffusion plate 7 are provided and arranged to control the properties of light which is emitted from the tubular lamps 8 and enters the display panel 3. In this case, the optical sheets 6 are preferably arranged by stacking three sheets preferably including a diffusion sheet 6a, a lens sheet 6b and a polarizing reflection sheet 6c, each of which preferably has a thickness of about 0.1 mm to about 0.3 mm, for example. In addition, the diffusion plate 7 preferably has a thickness of about 2 mm, for example.

The tubular lamps 8 are preferably cold cathode tubes, and right-side and left-side ends thereof are inserted into electrode part holders 12 so as to be secured to the backlight chassis 9, as shown in FIG. 2. A reflector 16 is laid under the tubular lamps 8 and arranged to reflect the light emitted from the tubular lamps 8 toward the display panel 3. In order to improve reflectivity, projections 16a having a crest shape are provided on the reflector 16 so as to be located respectively between tube sections 8a of the tubular lamps 8.

The backlight chassis 9, substantially in the shape of a box, has a lamp housing portion 9a including a bottom portion 9b and side-wall portions 9c and 9d, and support surfaces 9e and 9f extending outward respectively from upper edges of the side-wall portions 9c and 9d. In the backlight chassis 9, the bottom portion 9b and the longer side-wall portions 9c preferably include a member 10 which is prepared by subjecting a metal plate material to plate metal processing, and the shorter side-wall portions 9d preferably include a member 11 which is molded of resin.

The tubular lamp 8 is secured to the lamp housing portion 9a of the backlight chassis 9 with the use of the above-mentioned electrode part holder 12, and also with the use of a member 15 which includes lamp clips 13 for holding the tube section 8a at an approximate midpoint thereof, and a holding pin 14 for preventing the diffusion plate 7 which is arranged above from bending downward to preclude luminance irregularity, as illustrated.

The above-mentioned frame 5 is secured to the support surfaces 9e and 9f of the backlight chassis 9 while interposing the optical sheets 6 and the diffusion plate 7 therebetween. In this case, as shown in FIG. 2, protrusion portions 9g preferably having a square shape or a substantially square shape are formed as a projection at center portions of the support surfaces 9e and 9f, and a height of the protrusion portions 9g from the support surfaces 9e and 9f is preferably about 1.5 mm, for example, which is less than 2 mm, the thickness of the diffusion plate 7. As a counterpart of the protrusion portions 9g, concave portions 7a are formed as a notch at center positions on the four edges of the diffusion plate 7. By fitting the protrusion portions 9g into the concave portions 7a, the diffusion plate 7 is positioned and supported on the support surfaces 9e and 9f. Thereby, the diffusion plate 7 having the thickness of 2 mm which is relatively heavy is prevented from rattling inside the backlight unit 4.

As illustrated, there are formed no notches like the concave portions 7a of the diffusion plate 7 on the four edges of the diffusion sheet 6a, the lens sheet 6b and the polarizing reflection sheet 6c which make up the optical sheets 6. Since the height of the protrusion portions 9g formed on the support surfaces 9e and 9f preferably is less than the thickness of the diffusion plate 7, the protrusion portions 9g do not make contact with the optical sheets 6 and have a function of positioning and supporting only the diffusion plate 7. Accordingly, as shown in FIG. 3, the protrusion portions 9g do not interfere with a thermal expansion increment of the optical sheets 6 in use. Thereby, the deformed portions 46 which occur when the protrusion portions 39g interfere with a thermal expansion increment of the optical sheets 35 as shown in FIG. 6 and mentioned in the Description of the Related Art do not occur, and luminance irregularity caused thereby is prevented.

In addition, in these preferred embodiments, a width of a gap between the support surfaces 9e and 9f of the backlight chassis 9 and the frame 5, that is, an interposition width in interposing the diffusion plate 7 and the optical sheets 6 therebetween, is equal to or larger than a total thickness of the diffusion plate 7 and the optical sheets 6. With such a configuration, a load generated by the interposition is not applied on the optical sheets 6, the optical sheets 6 can be allowed to expand or contract by the thermal expansion increment in any direction, the occurrence of the deformed portions 46 in the optical sheets 6 is prevented more advantageously.

The foregoing description of preferred embodiments and the implementation example of the present invention has been presented for purposes of illustration and description with reference to the drawings. However, it is not intended to limit the present invention to the preferred embodiments, and modifications and variations are possible as long as they do not deviate from the principles of the present invention. For example, the positioning piece having the function of positioning and supporting only the diffusion plate is not limited to the above-described protrusion portion having a substantially square shape, and may have a variety of shapes such as a rib shape, a substantially triangular shape or a dome shape. In addition, the concave portions formed as a notch on the four edges of the diffusion plate may have a variety of shapes such as a circular hole shape and are not limited to the above-described preferred embodiments. Further, the number and a combination of the diffusion sheet, the lens sheet and the polarizing reflection sheet which make up the optical sheets are not limited to the above-described preferred embodiments.

What is claimed is:

1. A backlight unit comprising:
    a backlight chassis arranged to house a lamp such that a diffusion plate and optical sheets are arranged adjacent to the lamp, where a thickness of the optical sheets is less than a thickness of the diffusion plate, the backlight chassis including a support surface arranged to support the diffusion plate, and the optical sheets; and
    a frame arranged to hold the diffusion plate and the optical sheets with the support surface of the backlight chassis, the diffusion plate and the optical sheets being interposed between the frame and the support surface; wherein
    the diffusion plate includes, on an edge of the diffusion plate, concave portions including a notch;
    the backlight chassis includes, on the support surface, protrusion portions arranged to fit into the concave portions of the diffusion plate to thereby position the diffusion plate;
    a height of the protrusion portions is substantially equal to or less than the thickness of the diffusion plate; and
    at least a portion of each of the protrusion portions is located under the optical sheets.

2. The backlight unit according to claim 1, wherein a width of a gap between the support surface of the backlight chassis and the frame is equal to or larger than a total thickness of the diffusion plate and the optical sheets.

3. A display device comprising the backlight unit according to claim 1.

\* \* \* \* \*

UNITED STATES PATENT AND TRADEMARK OFFICE
CERTIFICATE OF CORRECTION

| | | |
|---|---|---|
| PATENT NO. | : 7,766,500 B2 | Page 1 of 1 |
| APPLICATION NO. | : 11/908078 | |
| DATED | : August 3, 2010 | |
| INVENTOR(S) | : Yoshiki Takata | |

It is certified that error appears in the above-identified patent and that said Letters Patent is hereby corrected as shown below:

Title page, item (30)    Foreign Application Priority Data should read as follows:

March 10, 2005   (JP)   ............................... 2005-067197

Signed and Sealed this

Twenty-sixth Day of October, 2010

David J. Kappos
*Director of the United States Patent and Trademark Office*